United States Patent
Lee et al.

(10) Patent No.: US 12,074,634 B2
(45) Date of Patent: Aug. 27, 2024

(54) ELECTRONIC DEVICE FOR CELL COVERAGE ENHANCEMENT AND OPERATION METHOD THEREOF

(71) Applicant: Samsung Electronics Co., Ltd., Suwon-si (KR)

(72) Inventors: Ikbeom Lee, Suwon-si (KR); Hyunil Yoo, Suwon-si (KR); Youngbum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/979,337

(22) Filed: Nov. 2, 2022

(65) Prior Publication Data

US 2023/0125801 A1 Apr. 27, 2023

Related U.S. Application Data

(63) Continuation of application No. PCT/KR2022/014940, filed on Oct. 5, 2022.

(30) Foreign Application Priority Data

Oct. 25, 2021 (KR) .................. 10-2021-0142623

(51) Int. Cl.
*H04B 1/71* (2011.01)
*H04B 1/7136* (2011.01)
*H04L 25/02* (2006.01)

(52) U.S. Cl.
CPC ......... *H04B 1/7136* (2013.01); *H04L 25/021* (2013.01); *H04L 25/0224* (2013.01)

(58) Field of Classification Search
CPC . H04B 1/7136; H04L 25/021; H04L 25/0224; H04L 25/0226
See application file for complete search history.

(56) References Cited

U.S. PATENT DOCUMENTS 8,259,865 B2 * 9/2012 Krishnamoorthi .......................... H04L 25/0202 455/130
8,437,436 B2 5/2013 Park et al.
(Continued)

FOREIGN PATENT DOCUMENTS

| JP | 5580346 B2 | 8/2014 |
|---|---|---|
| WO | 2018/225935 A1 | 12/2018 |
| WO | 2021/030930 A1 | 2/2021 |

OTHER PUBLICATIONS

Interdigital Inc.,'Discussions on PUCCH enhancements', R1-2110155, 3GPP TSG-RAN WG1 Meeting #106b-e, Oct. 2, 2021.
(Continued)

*Primary Examiner* — Rahel Guarino

(74) *Attorney, Agent, or Firm* — Jefferson IP Law, LLP

(57) ABSTRACT

A device and a method for cell coverage enhancement by an electronic device in a wireless communication system are provided. The electronic device includes a communication circuit and a processor, wherein the processor identifies a channel variation of an external device configured to perform communication via the communication circuit, configures a frequency hopping interval corresponding to the external device, based on the channel variation of the external device, transmits information related to the frequency hopping interval to the external device, and transmits, based on the frequency hopping interval, at least one reference signal assigned to at least one slot corresponding to at least one frequency band to the external device.

20 Claims, 10 Drawing Sheets

(56) References Cited

U.S. PATENT DOCUMENTS

| | | |
|---|---|---|
| 9,131,515 B2 | 9/2015 | Zhuang et al. |
| 10,356,740 B2 | 7/2019 | Zhang et al. |
| 10,404,493 B2 | 9/2019 | Lee et al. |
| 10,462,801 B2 | 10/2019 | Nammi et al. |
| 10,856,296 B2 | 12/2020 | Yerramalli et al. |
| 2012/0300740 A1 | 11/2012 | Iwai et al. |
| 2018/0367247 A1 | 12/2018 | Kim et al. |
| 2020/0153588 A1 | 5/2020 | Hwang et al. |
| 2020/0162303 A1 | 5/2020 | Kim et al. |
| 2020/0351023 A1* | 11/2020 | Rico Alvarino ........ H04W 8/24 |
| 2021/0007091 A1 | 1/2021 | Frenne et al. |

OTHER PUBLICATIONS

Qualcomm Incorporated, 'PUCCH enhancements', R1-2110204, 3GPP TSG-RAN WG1 Meeting #106b-e, Oct. 2, 2021.
International Search Report dated Jan. 16, 2023, issued in International Search Report.

* cited by examiner

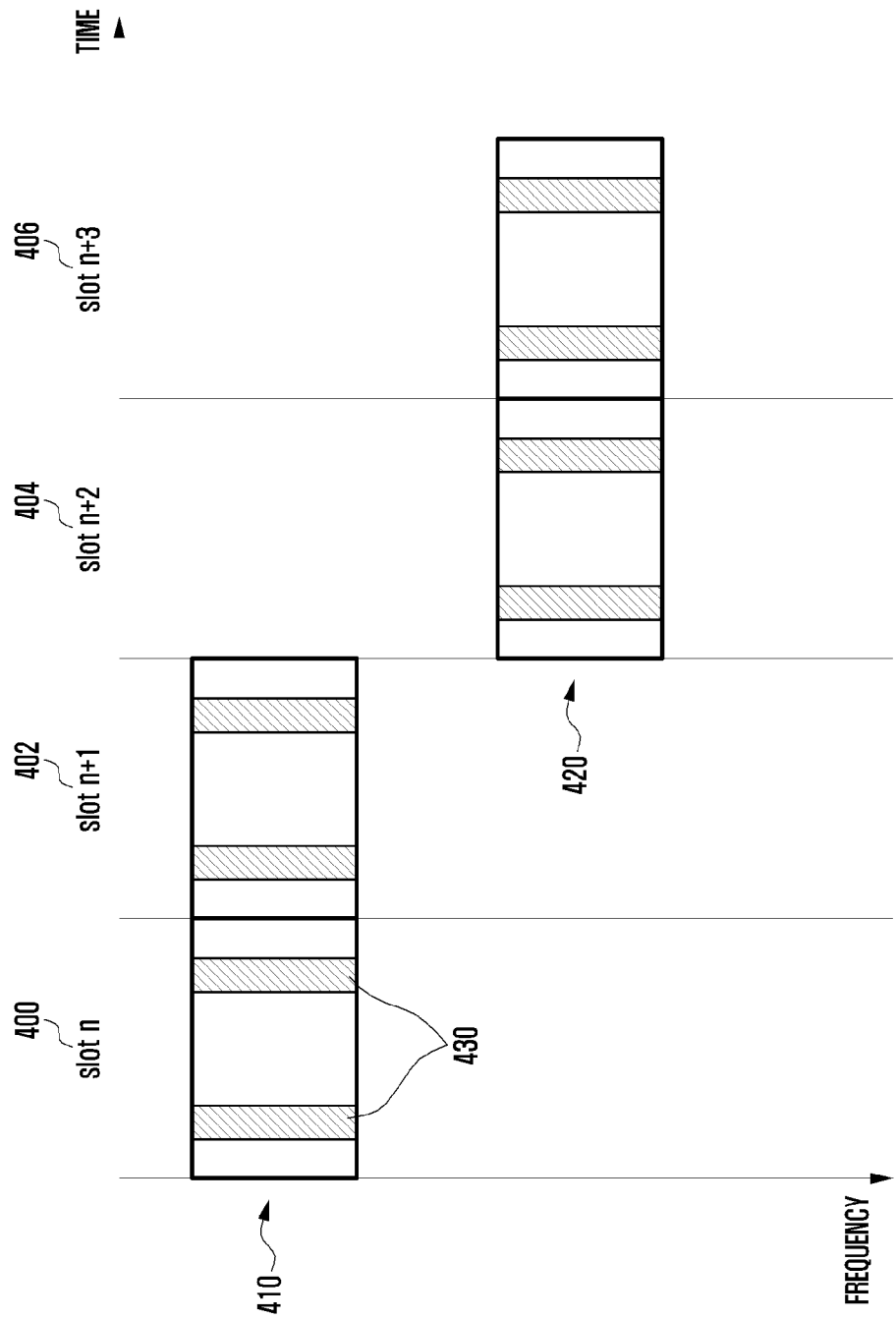

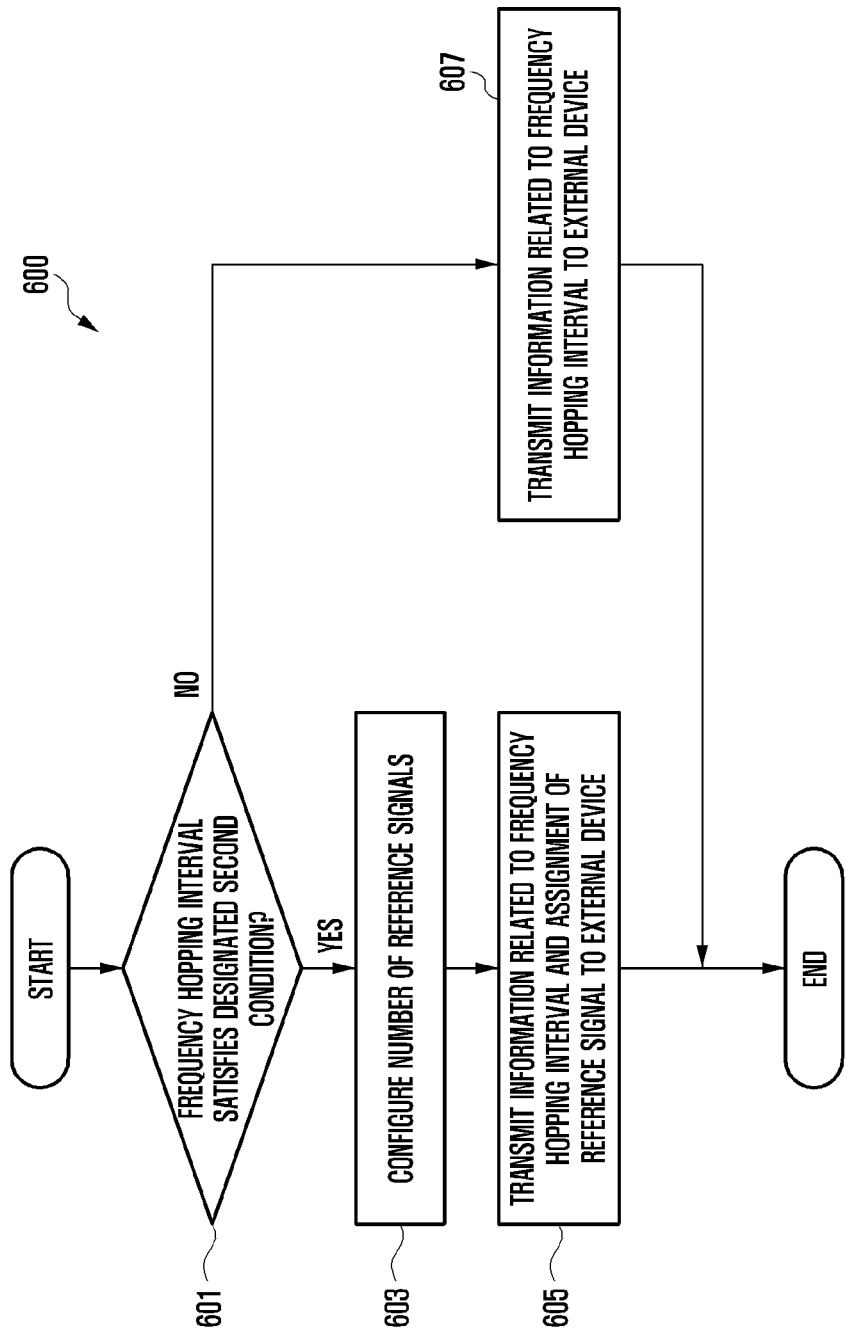

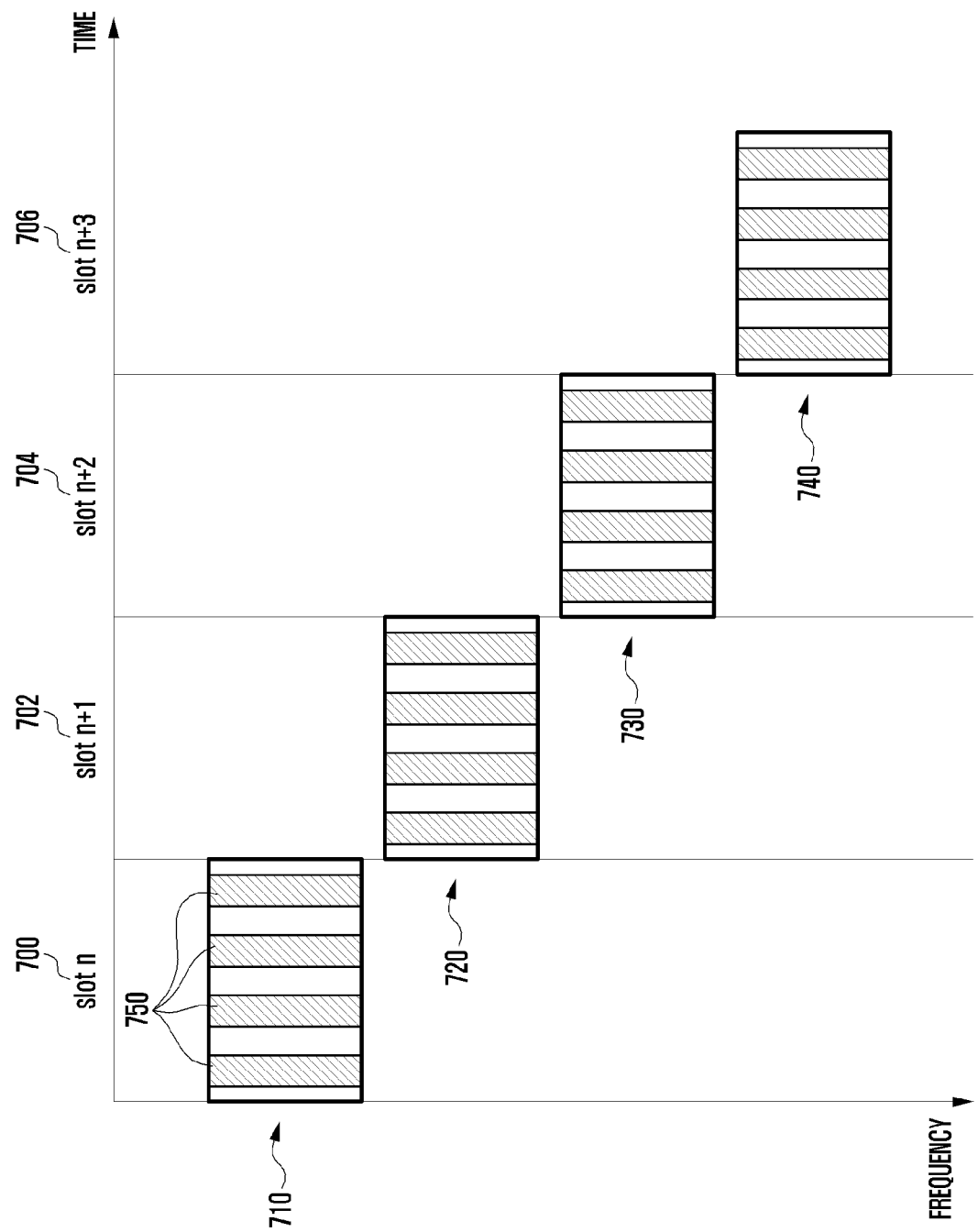

ELECTRONIC DEVICE FOR CELL COVERAGE ENHANCEMENT AND OPERATION METHOD THEREOF

CROSS-REFERENCE TO RELATED APPLICATION(S)

This application is a continuation application, claiming priority under § 365(c), of an International application No. PCT/KR2022/014940, filed on Oct. 5, 2022, which is based on and claims the benefit of a Korean patent application number 10-2021-0142623, filed on Oct. 25, 2021, in the Korean Intellectual Property Office, the disclosure of which is incorporated by reference herein in its entirety.

TECHNICAL FIELD

The disclosure relates to a device and a method for cell coverage enhancement by an electronic device in a wireless communication system.

BACKGROUND ART

With development of wireless communication technology, electronic devices (e.g., communication electronic devices) have been universally used in daily life, and the usage of contents has exponentially increased accordingly. Due to the rapid increase in the usage of the contents, network capacity has gradually reached the limit, and in order to meet the increasing demand for wireless data traffic after the commercialization of the 4th generation (4G) communication system, efforts are being made to develop a communication system (e.g., 5th generation (5G), pre-5G, or new radio (NR)) that transmits and/or receives signals by using a frequency of a high-frequency (e.g., millimeter wave (mmWave)) band (e.g., an approximately 1.8 gigahertz (GHz) band and/or an approximately 3 GHz to 300 GHz band).

The above information is presented as background information only to assist with an understanding of the disclosure. No determination has been made, and no assertion is made, as to whether any of the above might be applicable as prior art with regard to the disclosure.

DISCLOSURE

Technical Problem

An electronic device (e.g., a base station) of a wireless communication system may apply a technology to extend the coverage of a cell operated by the electronic device. For example, an electronic device (e.g., a base station) may apply an inter-slot channel estimation technology for improving the channel estimation performance of an external device (e.g., a terminal) located in a cell edge region. In order to improve the channel estimation performance of an external device (e.g., a terminal), the inter-slot channel estimation technology may include a method of assigning reference signals (e.g., a demodulation reference signal (DMRS)) via multiple consecutive slots of the same frequency band. An external device may improve channel estimation performance by estimating a channel by using reference signals received via multiple consecutive slots.

In the inter-slot channel estimation technology, since an external device estimates a channel by using reference signals received via the same frequency band in different time resources (e.g., slots), the channel estimation performance of the external device may be improved in an environment in which a change in a channel between an electronic device and the external device is relatively small.

However, in the inter-slot channel estimation technology, if a change in a channel between an electronic device and an external device is relatively severe, the channel estimation performance of the external device may be deteriorated due to occurrence of a relatively severe difference in channel gain between different time resources (e.g., slots).

Aspects of the disclosure are to address at least the above-mentioned problems and/or disadvantages and to provide at least the advantages described below. Accordingly, an aspect of the disclosure is to provide a device and a method for cell coverage enhancement by an electronic device (e.g., a base station) in a wireless communication system.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a communication circuit and a processor operatively connected to the communication circuit, wherein the processor identifies a channel variation of an external device configured to perform communication via the communication circuit, configures a frequency hopping interval corresponding to the external device, based on the channel variation of the external device, transmits information related to the frequency hopping interval to the external device, and transmits, based on the frequency hopping interval, at least one reference signal assigned to at least one slot corresponding to at least one frequency band to the external device.

In accordance with another aspect of the disclosure, an operation method of an electronic device is provided. The operation method includes identifying a channel variation of an external device connected to the electronic device for communication, configuring a frequency hopping interval corresponding to the external device, based on the channel variation of the external device, transmitting information related to the frequency hopping interval to the external device, and transmitting, based on the frequency hopping interval, at least one reference signal assigned to at least one slot corresponding to at least one frequency band to the external device.

Advantageous Effects

According to various embodiments of the disclosure, an electronic device (e.g., a base station) can improve the channel estimation performance of an external device (e.g., a terminal) located in a cell edge region so as to enhance cell coverage, by adjusting an assignment ratio of a reference signal and/or a frequency hopping interval for the external device.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 4A is an example in which an electronic device configures a frequency hopping interval to a first interval according to an embodiment of the disclosure;

FIG. 6 is a flowchart for configuring an assignment ratio of a reference signal by an electronic device according to an embodiment of the disclosure;

FIG. 7A is an example of assigning a reference signal at a first ratio by an electronic device according to an embodiment of the disclosure;

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments will be described in detail with reference to attached drawings.

Figure 1:
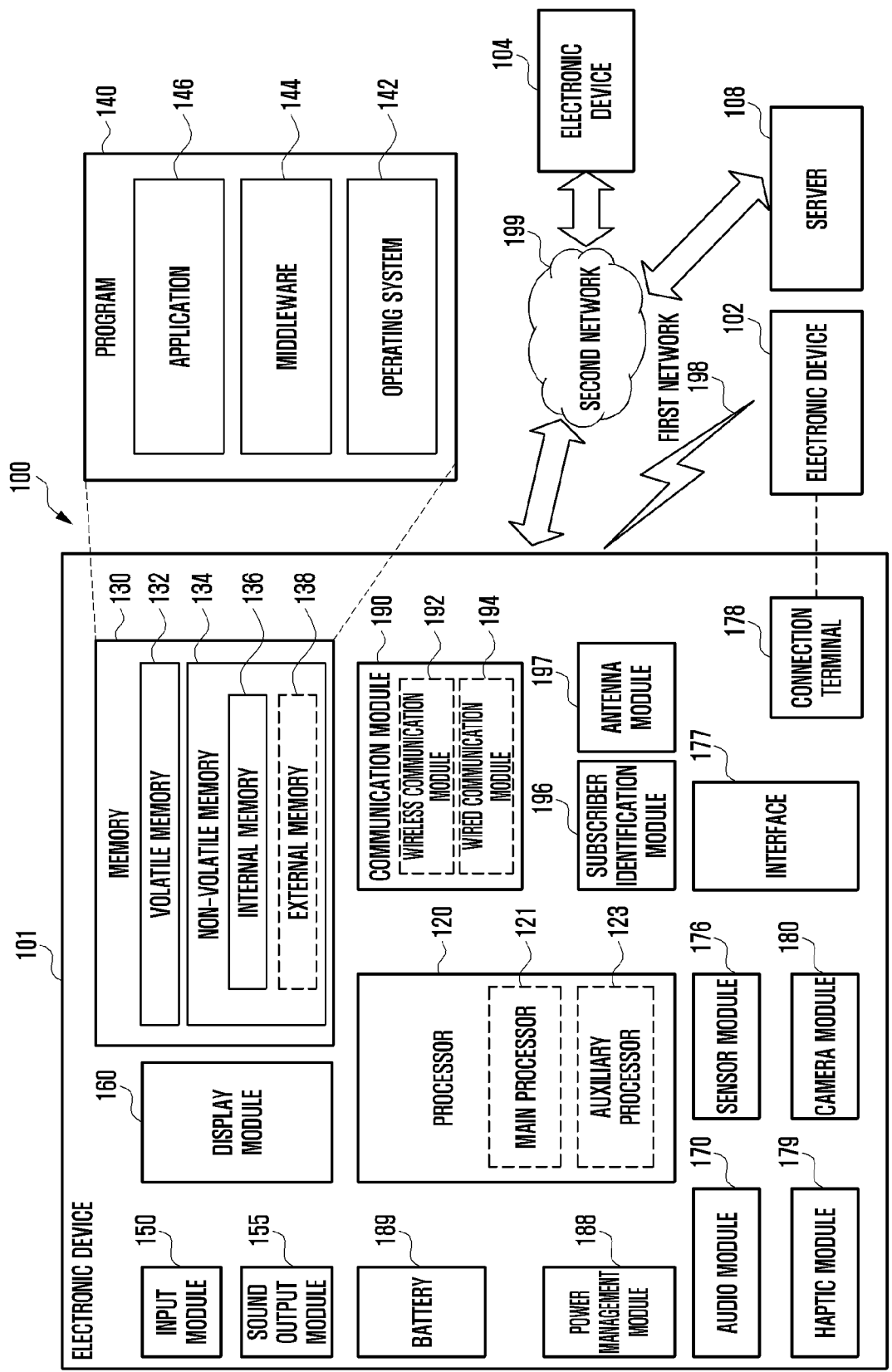
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the external electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. The subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
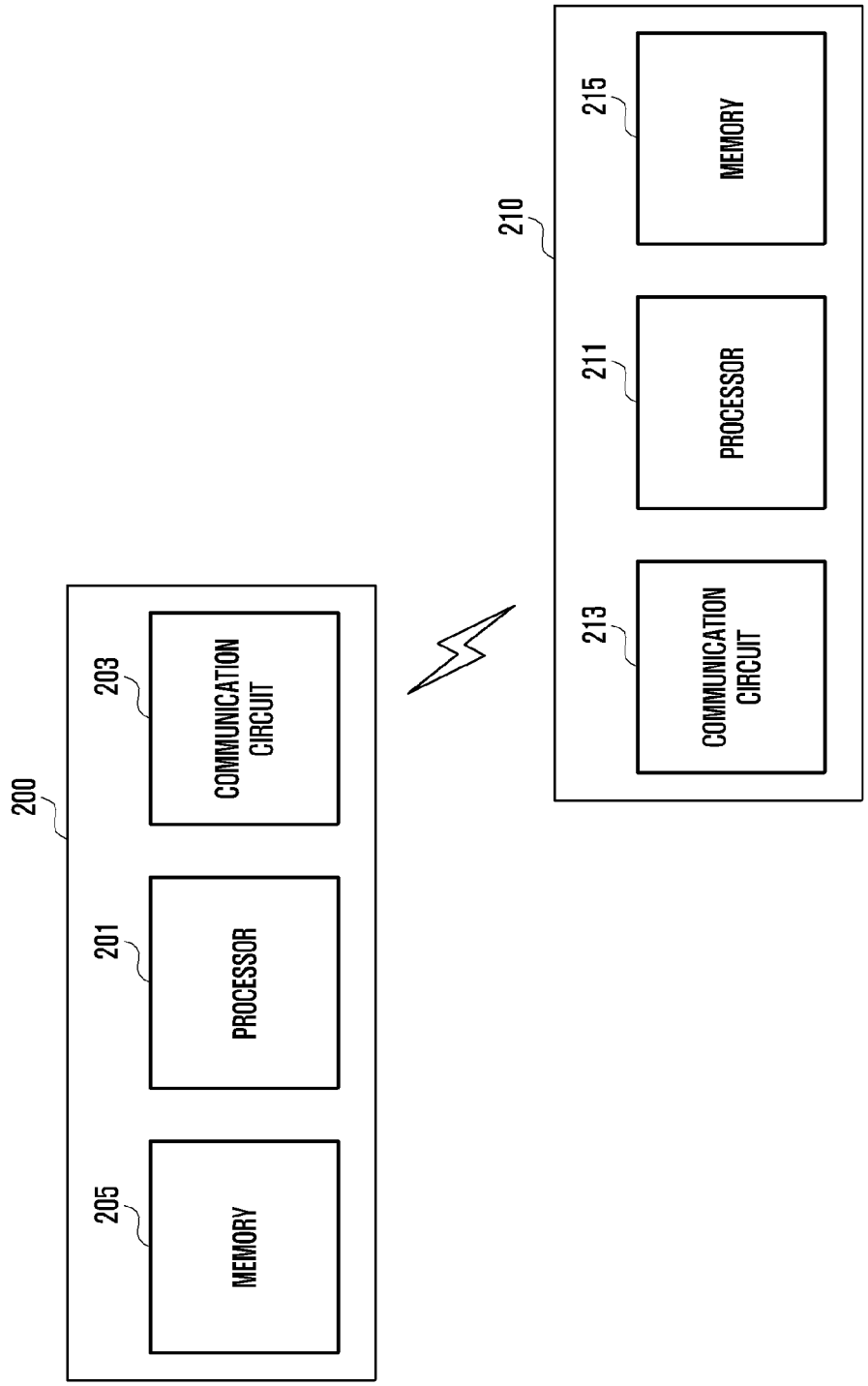
FIG. 2 is a block diagram of a wireless communication system for channel estimation according to an embodiment of the disclosure.

FIG. 2 is a block diagram of a wireless communication system for channel estimation according to an embodiment of the disclosure.

In the following description, an electronic device 200 may be at least partially similar to the electronic device 101 of FIG. 1 or may include another embodiment of the electronic device. An external device 210 may be at least partially similar to the electronic device 101 of FIG. 1 or may include another embodiment of an external device.

Referring to FIG. 2, a wireless communication system may include an electronic device 200 and at least one external device (e.g., an external device 210). According to an embodiment, the electronic device 200 may communicate with the external device 210 by using a radio resource. According to an embodiment, the electronic device 200 may include a transmission node or a base station which allocates a radio resource (e.g., a frequency resource and/or a time resource) to the external device 210. As an example, the electronic device 200 may include an evolved node B (eNB) and/or a next generation node B (gNB). According to an embodiment, the external device 210 may include a user terminal (user equipment (UE)) which performs communication with the electronic device 200 by using a radio resource allocated from the electronic device 200.

According to various embodiments, the electronic device 200 may include a processor 201, a communication circuit 203, and/or a memory 205. According to an embodiment, the processor 201 may be substantially the same as the processor 120 of FIG. 1 or may include the processor 120. According to an embodiment, the communication circuit 203 may be substantially the same as the wireless communication module 192 of FIG. 1 or may include the wireless communication module 192. According to an embodiment, the memory 205 may be substantially the same as the memory 130 of FIG. 1 or may include the memory 130. According to an embodiment, the processor 201 may be operatively connected to the communication circuit 203 and/or the memory 205.

According to various embodiments, the processor 201 may identify a channel variation of the external device 210 to which communication is connected. According to an embodiment, the processor 201 may determine whether the external device 210, in which a communication link has been established with the electronic device 200, is located in a cell edge region. For example, when information related to a channel state provided from the external device 210 satisfies a designated first condition, the processor 201 may determine that the external device 210 is located in the cell edge region. For example, when the processor 201 determines that the external device 210 is located in the cell edge region, the processor 201 may identify a channel variation of the external device 210.

According to an embodiment, when the processor 201 determines that the external device 210 is located in the cell edge region, the processor 201 may control the communication circuit 203 to transmit a request signal related to the channel variation to the external device 210. The processor

201 may obtain information related to the channel variation from the external device 210 via the communication circuit 203 in response to the request signal. For example, the state satisfying the designated first condition may include a state in which a channel state of the external device 210 is equal to or smaller than a reference state continuously for a designated first time period. For example, the channel state of the external device 210 may include a modulation and coding scheme (MCS) level, a received signal strength indicator (RSSI), a reference signal received power (RSRP), a reference signal received quality (RSRQ), a signal to noise ratio (SNR), and/or a signal to interference and noise ratio (SINR). For example, the channel variation of the external device 210 may indicate a difference (or difference value) of a channel change of the external device, which occurs during a designated time interval. For example, a cell edge region may include at least a part of the edge of a coverage region among cell coverage regions operated by the electronic device 200.

According to an embodiment, the processor 201 may estimate the channel variation of the external device 210, based on information related to moving of the external device 210, which is received from the external device 210 via the communication circuit 203. For example, the channel variation of the external device 210 may be generated in proportion to a moving distance of the external device 210. For example, the processor 201 may determine that the channel variation of the external device 210 is relatively large as the moving distance of the external device 210 is relatively long. For example, information related to the moving of the external device 210 may include information related to a change in a position of the external device 210, which is measured based on a positioning system (global navigation satellite system (GNSS)) of the external device 210 during a designated second time period. For example, information related to the moving of the external device 210 may include information related to a change in a start position of a frame (or a start position of a symbol), which is measured by the external device 210 during a designated third time period. For example, information related to the moving of the external device 210 may be received via a physical uplink control channel (PUCCH) and/or an uplink control indicator (UCI).

According to an embodiment, the processor 201 may estimate the channel variation of the external device 210, based on information related to Doppler spread of the external device 210, which is received from the external device 210 via the communication circuit 203. For example, the information related to Doppler spread of the external device 210 may be received via a PUCCH and/or UCI.

According to an embodiment, the processor 201 may estimate the channel variation of the external device 210, based on a timing advance (TA) value received from the external device 210 via the communication circuit 203.

According to an embodiment, the processor 201 may estimate a Doppler spread value, based on an uplink reference signal received from the external device 210 via the communication circuit 203. The processor 201 may estimate the channel variation of the external device 210, based on the Doppler spread value estimated based on the uplink reference signal. For example, the uplink reference signal may include a sounding reference signal (SRS), a phase tracking reference signal (PTRS), and/or a demodulation reference signal (DMRS).

According to various embodiments, the processor 201 may configure a frequency hopping interval of the external device 210, based on the channel variation of the external device 210. According to an embodiment, the processor 201 may configure, as the frequency hopping interval of the external device 210, a frequency hopping interval corresponding to the channel variation of the external device 210, which is detected in a predefined frequency hopping interval table. For example, the frequency hopping interval may include the number of slots consecutively assigned to the external device 210 in the same frequency band. For example, the frequency hopping interval table may include information related to the range of the channel variation of the external device 210, which corresponds to a specific frequency hopping interval.

According to an embodiment, the processor 201 may configure, to a first interval (e.g., four slots), the frequency hopping interval of the external device 210 if the channel variation of the external device 210 is less than a first reference variation (e.g., about 25 hertz (Hz)) (e.g., a first channel change level). For example, the first reference variation may include a minimum reference variation among multiple reference variations for configuration of a frequency hopping interval. For example, a state (e.g., the first channel change level) in which the channel variation of the external device 210 is less than the first reference variation (e.g., about 25 Hz) may include a state in which a channel change of the external device 210 is relatively small.

According to an embodiment, the processor 201 may configure, to a second interval (e.g., three slots), the frequency hopping interval of the external device 210 if the channel variation of the external device 210 is equal to or greater than the first reference variation (e.g., about 25 Hz) and is less than a second reference variation (e.g., about 50 Hz) (e.g., a second channel change level). For example, the second reference variation may include a value larger than the first reference variation among multiple reference variations for configuration of a frequency hopping interval. For example, the second channel change level may include a state in which the channel change of the external device 210 is greater than the first channel change level but is smaller than a third channel change level.

According to an embodiment, the processor 201 may configure, to a third interval (e.g., two slots), the frequency hopping interval of the external device 210 if the channel variation of the external device 210 is equal to or greater than the second reference variation (e.g., about 50 Hz) and is less than a third reference variation (e.g., about 100 Hz) (e.g., the third channel change level). For example, the third reference variation is a value larger than the second reference variation among multiple reference variations for configuration of a frequency hopping interval, and may include a maximum reference variation. For example, the third channel change level may include a state in which the channel change of the external device 210 is greater than the second channel change level but is smaller than a fourth channel change level.

According to an embodiment, the processor 201 may configure, to a fourth interval (e.g., one slot), the frequency hopping interval of the external device 210 if the channel variation of the external device 210 is equal to or greater than the third reference variation (e.g., about 100 Hz) (e.g., the fourth channel change level). For example, a state (e.g., the fourth channel change level) in which the channel variation of the external device 210 is equal to or greater than the third reference variation (e.g., about 100 Hz) may include a state in which the channel change of the external device 210 is relatively large.

According to an embodiment, the processor 201 may configure at least one frequency for frequency hopping of the external device 210, based on channel state information of the external device 210 estimated based on an uplink reference signal.

According to various embodiments, the processor 201 may configure an assignment ratio of a reference signal corresponding to the external device 210. According to an embodiment, the processor 201 may configure the assignment ratio of the reference signal to be assigned to the external device 210, based on a channel state (e.g., SNR) and the channel variation of the external device 210. For example, the assignment ratio of the reference signal may be configured to be proportional to the channel variation of the external device 210, and to be inversely proportional to the channel state (e.g., SNR). For example, if the channel variation of the external device 210 is less than the first reference variation in a strong electric field state, the processor 201 may assign a first number (e.g., one) of reference signals per slot. For example, if the channel variation of the external device 210 is greater than the third reference variation in the strong electric field state, the processor 201 may assign a second number (e.g., four) of reference signals per slot. For example, if the channel state (e.g., SNR) with respect to the external device 210 is greater than a reference state (e.g., a strong electric field) in a state where the channel variation of the external device 210 is less than the first reference variation, the processor 201 may assign the first number (e.g., one) of reference signals per slot. For example, if the channel state (e.g., SNR) with respect to the external device 210 is smaller than a reference state (e.g., a weak electric field) in a state where the channel variation of the external device 210 is less than the first reference variation, the processor 201 may assign a third number (e.g., two) of reference signal per slot. For example, the assignment ratio of the reference signal may include the number of reference signals assigned in a time resource block (e.g., a slot).

According to various embodiments, the processor 201 may control the communication circuit 203 to transmit, to the external device 210, information related to the assignment ratio of the reference signal and the frequency hopping interval associated with the external device 210. For example, the information related to the assignment ratio of the reference signal and the frequency hopping interval associated with the external device 210 may be included in a system information block (SIB), a radio resource control (RRC) message (e.g., RRC connection reconfiguration), and/or a downlink control indicator (DCI) to as to be transmitted.

According to various embodiments, based on the information related to the assignment ratio of the reference signal and the frequency hopping interval associated with the external device 210, the processor 201 may control the communication circuit 203 to transmit at least one reference signal (e.g., DMRS) to the external device 210 via at least one slot for each frequency. According to an embodiment, the processor 201 may identify a frequency band to which a reference signal is assigned and/or at least one slot corresponding to the frequency band, based on the frequency hopping interval associated with the external device 210. According to an embodiment, the processor 201 may identify an assignment position of the reference signal in each slot, based on information related to the assignment ratio of the reference signal associated with the external device 210. According to an embodiment, the processor 201 may control the communication circuit 203 to transmit at least one reference signal via at least one slot corresponding to each frequency band.

According to various embodiments, the communication circuit 203 may support transmission and/or reception of signals and/or data between the electronic device 200 and the external device 210 via a wireless network. According to an embodiment, the communication circuit 203 may include a radio frequency integrated circuit (RFIC) and a radio frequency front end (RFFE) for communication with the external device 210. For example, the wireless network may include a 2nd generation (2G) network, a 3rd generation (3G) network, a 4G network (e.g., long term evolution (LTE)), and/or a 5G network (e.g., new radio (NR)).

According to various embodiments, the memory 205 may store various data used by at least one element (e.g., the processor 201 and/or the communication circuit 203) of the electronic device 200. According to an embodiment, data may include multiple reference values for determination of a channel variation, at least one reference value for determination of an assignment ratio of a reference signal, and/or information related to multiple reference variations for determination of a channel change level. According to an embodiment, the memory 205 may store various instructions executable by the processor 201.

According to various embodiments, the external device 210 may include a processor 211, a communication circuit 213, and/or a memory 215. According to an embodiment, the processor 211 may be substantially the same as the processor 120 of FIG. 1 or may include the processor 120. According to an embodiment, the communication circuit 213 may be substantially the same as the wireless communication module 192 of FIG. 1 or may include the wireless communication module 192. According to an embodiment, the memory 215 may be substantially the same as the memory 130 of FIG. 1 or may include the memory 130. According to an embodiment, the processor 211 may be operatively connected to the communication circuit 213 and/or the memory 215.

According to various embodiments, the processor 211 may control the communication circuit 213 to transmit information related to the channel variation of the external device 210 to the electronic device 200. According to an embodiment, the processor 211 may control the communication circuit 213 to periodically transmit information related to the channel variation of the external device 210 to the electronic device 200. According to an embodiment, when a request signal related to the channel variation is received from the electronic device 200 via the communication circuit 213, the processor 211 may control the communication circuit 213 to transmit information related to the channel variation of the external device 210 to the electronic device 200.

According to an embodiment, the processor 211 may identify a position change (or a moving distance) of the external device 210, which is measured based on a positioning system (GNSS) for a designated second time period. The processor 211 may control the communication circuit 213 to transmit information related to the position change (or the moving distance) of the external device 210 to the electronic device 200.

According to an embodiment, the processor 211 may identify a change in a start position of a frame (or a start position of a symbol), which is measured by the external device 210 for a designated third time period. The processor 211 may control the communication circuit 213 to transmit information related to the change in the start position of the frame (or the start position of the symbol) to the electronic device 200. For example, the start position of the frame (or the start position of the symbol) may be measured based on a reference signal and/or a synchronization signal received from the electronic device 200. As an example, the synchronization signal may include a primary synchronization signal (PSS) and/or a secondary synchronization signal (SSS). For example, the reference signal may include a DMRS, a cell-specific reference signal (CRS), a channel state information reference signal (CSI-RS), a positioning reference signal (PRS), and/or a PTRS.

According to an embodiment, the processor 211 may estimate a Doppler spread value of the external device 210. The processor 211 may control the communication circuit 213 to transmit information related to Doppler spread of the external device 210 to the electronic device 200. For example, the processor 211 may measure the Doppler spread value of the external device 210 via a reference signal assigned to an n-th symbol and a reference signal allocated to an (n+k)th symbol. For example, n and k are indices for distinguishing symbols and may include natural numbers.

According to an embodiment, the processor 211 may control the communication circuit 213 to transmit a channel change level corresponding to the channel variation of the external device 210 to the electronic device 200. For example, if the channel variation of the external device 210 is less than the first reference variation (e.g., about 25 Hz), the processor 211 may configure the channel change level of the external device 210 to the first channel change level. For example, the first channel change level may include a state in which a channel change of the external device 210 is relatively small. For example, if the channel variation of the external device 210 is equal to or greater than the first reference variation (e.g., about 25 Hz) and is less than the second reference variation (e.g., about 50 Hz), the processor 211 may configure the channel change level of the external device 210 to the second channel change level. For example, the second channel change level may include a state in which the channel change of the external device 210 is greater than the first channel change level and is smaller than the third channel change level. For example, if the channel variation of the external device 210 is equal to or greater than the second reference variation (e.g., about 50 Hz) and is less than the third reference variation (e.g., about 100 Hz), the processor 211 may configure the channel change level of the external device 210 to the third channel change level. For example, the third channel change level may include a state in which the channel change of the external device 210 is greater than the second channel change level and is smaller than the fourth channel change level. For example, if the channel variation of the external device 210 is equal to or greater than the third reference variation (e.g., about 100 Hz), the processor 201 may configure the channel change level of the external device 210 to the fourth channel change level. For example, the fourth channel change level may include a state in which the channel change of the external device 210 is relatively large. For example, information related to multiple reference variations for determination of a channel change level may be obtained via an RRC message, a system information block (SIB), DCI, and/or a medium access control (MAC) control element (CE).

According to various embodiments, the processor 211 may estimate a channel, based on information related to an assignment ratio of a reference signal and/or a frequency hopping interval associated with the external device 210, which are received from the electronic device 200 via the communication circuit 213. According to an embodiment, the processor 211 may identify a frequency band to which a reference signal is assigned and/or at least one slot corresponding to the frequency band, based on the frequency hopping interval. According to an embodiment, the processor 211 may identify a position of a reference signal assigned to each slot, based on information related to the assignment ratio of the reference signal. According to an embodiment, the processor 211 may estimate a downlink channel with respect to the electronic device 200, based on at least one reference signal assigned to at least one slot via each frequency band.

According to various embodiments, the processor 211 may control the communication circuit 213 to communicate with the electronic device 200, based on a channel estimation result. According to an embodiment, the processor 211 may restore, based on the channel estimation result, data received from the electronic device 200 via the communication circuit 213.

According to various embodiments, the communication circuit 213 may support transmission and/or reception of signals and/or data between the external device 210 and the electronic device 200 via the wireless network. According to an embodiment, the communication circuit 213 may include an RFIC and an RFFE for communication with the electronic device 200. According to an embodiment, the communication circuit 213 may transmit information related to the channel variation of the external device 210 to the electronic device 200. For example, information related to the channel variation of the external device 210 may be transmitted to the electronic device 200 via a physical uplink control channel (PUCCH) and/or an uplink control indicator (UCI).

According to various embodiments, the memory 215 may store various data used by at least one element (e.g., the processor 211 and/or the communication circuit 213) of the external device 210. According to an embodiment, the data may include information related to multiple reference variations for determination of a channel change level. According to an embodiment, the memory 215 may store various instructions executable by the processor 211.

According to various embodiments, an electronic device (e.g., the electronic device 101 of FIG. 1 or the electronic device 200 of FIG. 2) may include a communication circuit (e.g., the wireless communication module 192 of FIG. 1 or the communication circuit 203 of FIG. 2) and a processor (e.g., the processor 120 of FIG. 1 or the processor 201 of FIG. 2) operatively connected to the communication circuit, wherein the processor identifies a channel variation of an external device configured to perform communication via the communication circuit, configures a frequency hopping interval corresponding to the external device, based on the channel variation of the external device, transmits information related to the frequency hopping interval to the external device, and transmits, based on the frequency hopping interval, at least one reference signal assigned to at least one slot corresponding to at least one frequency band to the external device.

According to various embodiments, the processor may estimate the channel variation of the external device, based on information related to a position change of the external device, which is received from the external device via the communication circuit.

According to various embodiments, the processor may estimate the channel variation of the external device, based on information related to a start position change of a frame, which is received from the external device via the communication circuit.

According to various embodiments, the processor may estimate the channel variation of the external device, based on a Doppler spread value of the external device, which is received from the external device via the communication circuit.

According to various embodiments, the processor may estimate the channel variation of the external device, based on a timing advance (TA) value of the external device, which is collected for a designated time period.

According to various embodiments, the processor may identify a Doppler spread value, based on an uplink reference signal received from the external device via the communication circuit, and may estimate the channel variation of the external device, based on the Doppler spread value.

According to various embodiments, the processor may configure an assignment ratio of a reference signal corresponding to the external device, based on the channel variation of the external device and/or a channel state of the external device, and may assign at least one reference signal to each of the at least one slot, based on the assignment ratio of the reference signal.

According to various embodiments, the processor may transmit information related to the frequency hopping interval and the assignment ratio of the reference signal to the external device via the communication circuit.

According to various embodiments, the processor may, when the frequency hopping interval corresponding to the external device satisfies a designated condition, configure the assignment ratio of the reference signal corresponding to the external device, based on the channel variation of the external device and/or the channel state of the external device.

According to various embodiments, when the frequency hopping interval corresponding to the external device is configured to a maximum interval and/or a minimum interval, the processor may determine that the designated condition is satisfied.

Figure 3:
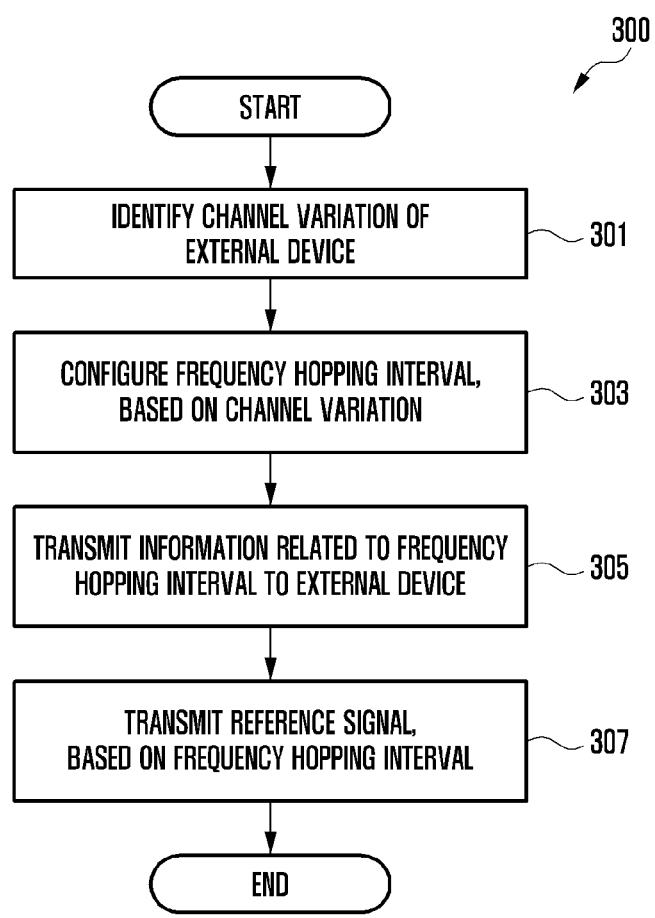
FIG. 3 is a flowchart for configuring a frequency hopping interval by an electronic device according to an embodiment of the disclosure.

FIG. 3 is a flowchart for configuring a frequency hopping interval by an electronic device according to an embodiment of the disclosure.

In the following embodiments, each of operations may be sequentially performed, but is not necessarily performed sequentially. For example, the order of each operation may be changed, and at least two operations may be performed in parallel. As an example, an electronic device of FIG. 3 may be the electronic device 101 of FIG. 1 or the electronic device 200 of FIG. 2. As an example, at least a part of FIG. 3 may be described with reference to FIGS. 4A and 4B.

Figure 4B:
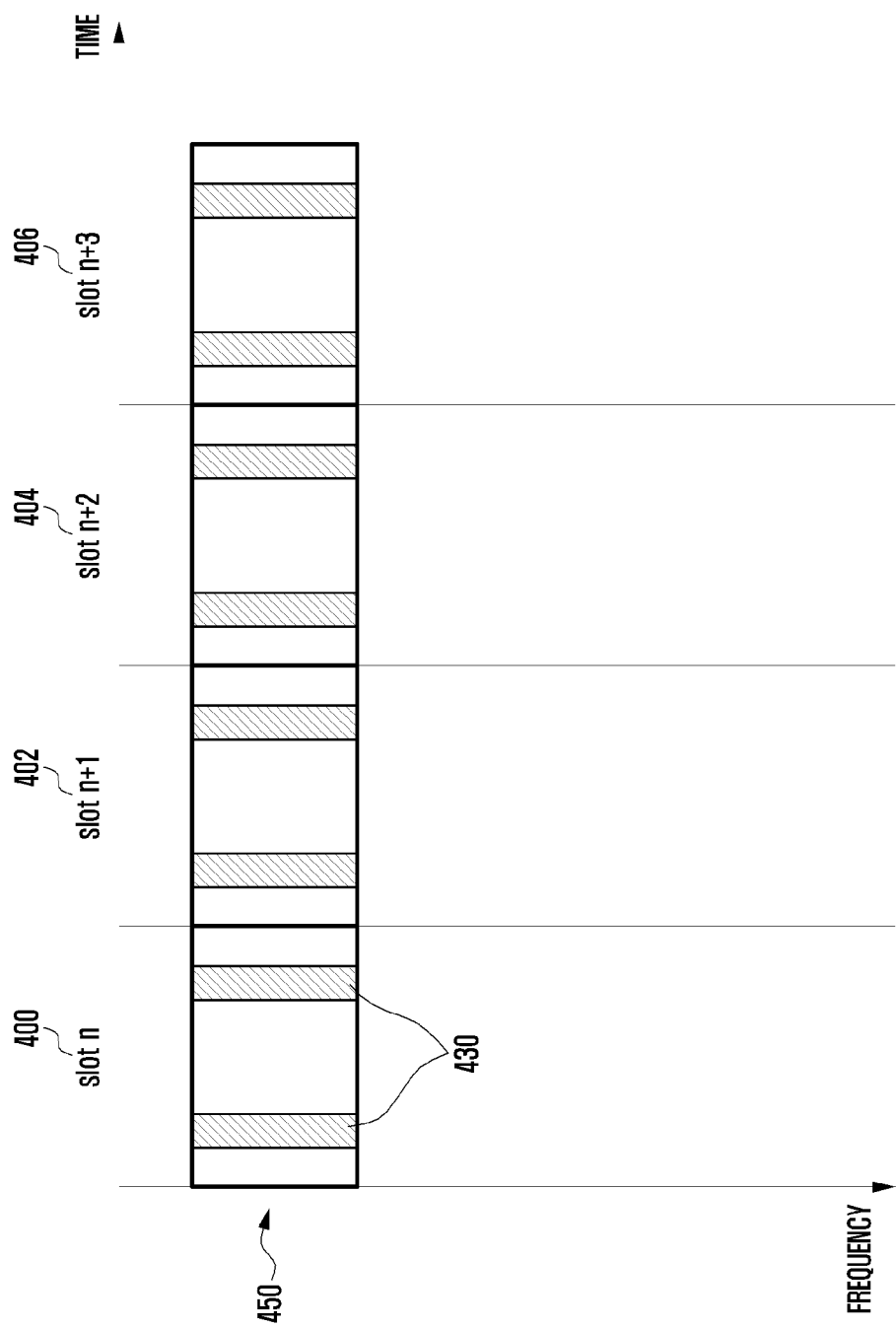
FIG. 4B is an example in which the electronic device configures the frequency hopping interval to a second interval according to an embodiment of the disclosure.

FIG. 4A is an example in which an electronic device configures a frequency hopping interval to a first interval according to an embodiment of the disclosure. FIG. 4B is an example in which the electronic device configures the frequency hopping interval to a second interval according to an embodiment of the disclosure.

Referring to FIGS. 3, 4A, and 4B, in flowchart 300 an electronic device (e.g., a processor 120 of FIG. 1 or a processor 201 of FIG. 2) may identify a channel variation of an external device 210, in operation 301. According to an embodiment, the processor 201 may estimate the channel variation of the external device 210, based on information related to moving of the external device 210, which is received from the external device 210 via the communication circuit 203. For example, information related to the moving of the external device 210 may include information (e.g., a moving distance) related to a position change of the external device 210 and/or a change in a start position of a frame (or a start position of a symbol), which is measured by the external device 210.

According to an embodiment, the processor 201 may estimate the channel variation of the external device 210, based on information related to Doppler spread of the external device 210, which is received from the external device 210 via the communication circuit 203. For example, the information related to Doppler spread of the external device 210 may be received via a PUCCH and/or UCI.

According to an embodiment, the processor 201 may estimate the channel variation of the external device 210, based on a TA value periodically received from the external device 210 via the communication circuit 203.

According to an embodiment, the processor 201 may estimate a Doppler spread value, based on an uplink reference signal received from the external device 210 via the communication circuit 203. The processor 201 may estimate the channel variation of the external device 210, based on the Doppler spread value estimated based on the uplink reference signal. For example, the channel variation of the external device 210 may indicate a difference (or difference value) of a channel change of the external device, which occurs during a designated time interval.

According to various embodiments, in operation 303, the electronic device (e.g., the processor 120 or 201) may configure a frequency hopping interval of the external device 210, based on the channel variation of the external device 210. According to an embodiment, the processor 201 may compare the channel variation of the external device 210 with multiple reference variations so as to configure the frequency hopping interval of the external device 210. For example, the frequency hopping interval may include the number of slots consecutively assigned to the external device 210 in the same frequency band.

According to an embodiment, if the channel variation of the external device 210 is less than the first reference variation (e.g., about 25 Hz), the processor 201 may determine that the channel variation of the external device 210 is the first channel change level. The processor 201 may configure, as shown in FIG. 4B, the frequency hopping interval of the external device 210 to the first interval (e.g., four slots), based on the first channel change level. For example, the first channel change level may include a state in which a channel change of the external device 210 is relatively small.

According to an embodiment, if the channel variation of the external device 210 is equal to or greater than the first reference variation (e.g., about 25 Hz) and is less than the second reference variation (e.g., about 50 Hz), the processor 201 may determine that the channel variation of the external device 210 is the second channel change level. The processor 201 may configure the frequency hopping interval of the external device 210 to the second interval (e.g., three slots), based on the second channel change level. For example, the second channel change level may include a state in which the channel change of the external device 210 is greater than the first channel change level but is smaller than the third channel change level.

According to an embodiment, if the channel variation of the external device 210 is equal to or greater than the second reference variation (e.g., about 50 Hz) and is less than the third reference variation (e.g., about 100 Hz), the processor 201 may determine that the channel variation of the external device 210 is the third channel change level. The processor 201 may configure, as shown in FIG. 4A, the frequency hopping interval of the external device 210 to the third interval (e.g., two slots), based on the third channel change level. For example, the third channel change level may include a state in which the channel change of the external device 210 is greater than the second channel change level but is smaller than the fourth channel change level.

According to an embodiment, if the channel variation of the external device 210 is equal to or greater than the third reference variation (e.g., about 100 Hz), the processor 201 may determine that the channel variation of the external device 210 is the fourth channel change level. The processor 201 may configure the frequency hopping interval of the external device 210 to the fourth interval (e.g., one slot), based on the fourth channel change level. For example, the fourth channel change level may include a state in which the channel change of the external device 210 is relatively large.

According to various embodiments, in operation 305, the electronic device (e.g., the processor 120 or 201) may transmit, to the external device 210, information related to the frequency hopping interval of the external device 210. According to an embodiment, the processor 201 may control the communication circuit 203 to transmit, to the external device 210, information related to an assignment ratio of a reference signal and/or the frequency hopping interval associated with the external device 210 via a system information block (SIB), an RRC message (e.g., RRC connection reconfiguration), and/or DCI.

According to various embodiments, in operation 307, the electronic device (e.g., the processor 120 or 201) may transmit, to the external device 210, at least one reference signal (e.g., DMRS) assigned to at least one slot, based on the frequency hopping interval of the external device 210. According to an embodiment, the processor 201 may assign, based on the frequency hopping interval, at least one reference signal to at least one slot for each of at least one frequency band corresponding to a frequency hopping pattern. The processor 201 may control the communication circuit 203 to transmit at least one slot, to which at least one reference signal is assigned, to the external device 210 via each frequency band.

According to an embodiment, when the frequency hopping interval is configured to the third interval (e.g., two slots), the processor 201 may control the communication circuit 203 to transmit a reference signal 430 via a first frequency band 410 in an nth slot 400 and an (n+1)th slot 402 as shown in FIG. 4A. The processor 201 may control the communication circuit 203 to transmit the reference signal 430 via a second frequency band 420 differing from the first frequency band 410 in an (n+2)th slot 404 and an (n+3)th slot 406 as shown in FIG. 4A. For example, the first frequency band 410 and the second frequency band 420 may be selected based on a predefined frequency hopping pattern.

According to an embodiment, when the frequency hopping interval is configured to the first interval (e.g., four slots), the processor 201 may control the communication circuit 203 to transmit the reference signal 430 via a third frequency band 450 in the nth slot 400, the (n+1)th slot 402, the (n+2) the slot 404, and the (n+3)th slot 406 as shown in FIG. 4B. For example, the third frequency band 450 may include a frequency band that is the same as or is different from the first frequency band 410 or the second frequency band 420.

In various embodiments, the electronic device 200 may compare the channel variation of the external device 210 with three reference variations so as to configure the frequency hopping interval of the external device 210. However, the number of reference variations for configuration of the frequency hopping interval of the external device 210 is not limited thereto. For example, the electronic device 200 may include at least one reference variation for configuration of the frequency hopping interval of the external device 210.

Figure 5:
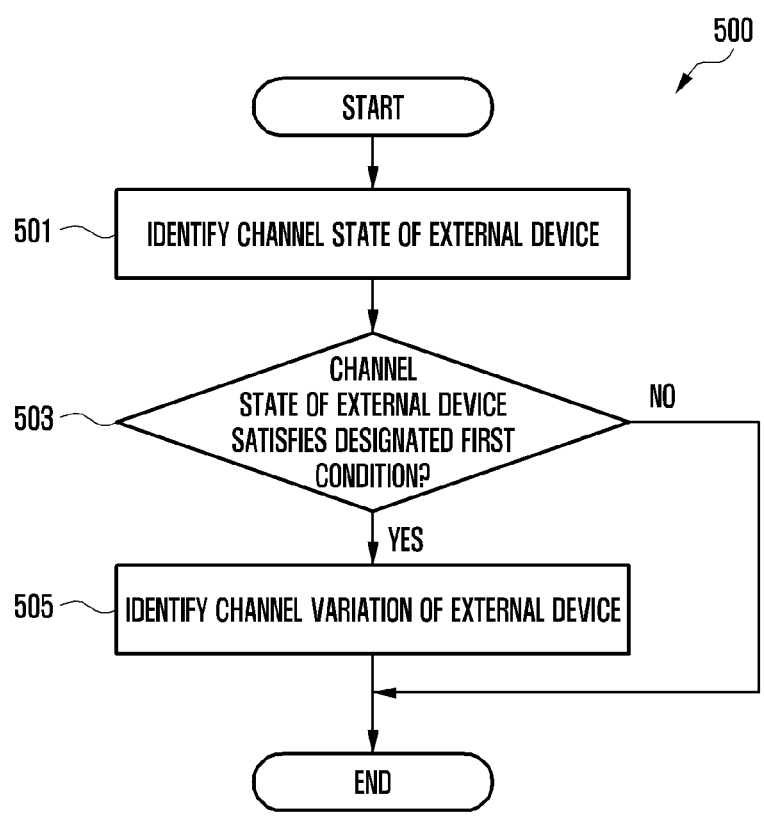
FIG. 5 is a flowchart for identifying a channel variation of an external device located in a cell edge region by an electronic device according to an embodiment of the disclosure.

FIG. 5 is a flowchart for identifying a channel variation of an external device located in a cell edge region by an electronic device according to an embodiment of the disclosure.

According to an embodiment, operations of FIG. 5 may be detailed operations of operation 301 of FIG. 3. In the following embodiments, each of operations may be sequentially performed, but is not necessarily performed sequentially. For example, the order of each operation may be changed, and at least two operations may be performed in parallel. As an example, an electronic device of FIG. 5 may be the electronic device 101 of FIG. 1 or the electronic device 200 of FIG. 2.

Referring to FIG. 5, in operation 501, of flowchart 500, an electronic device (e.g., a processor 120 of FIG. 1 or a processor 201 of FIG. 2) may identify a channel state of an external device 210 connected to an electronic device 200 for communication. According to an embodiment, the processor 201 may receive information related to the channel state from the external device 210 via the communication circuit 203. For example, the information related to the channel state may be received in response to a request signal related to the channel state, which has been transmitted to the external device 210 via the communication circuit 203. For example, the information related to the channel state may be periodically received from the external device 210 via the communication circuit 203. According to an embodiment, the processor 201 may estimate the channel state of the external device 210, based on a reference signal received from the external device 210 via the communication circuit 203. For example, the channel state of the external device 210 may include a modulation and coding scheme (MCS) level, a received signal strength indicator (RSSI), a reference signal received power (RSRP), a reference signal received quality (RSRQ), a signal to noise ratio (SNR), and/or a signal to interference and noise ratio (SINR).

According to various embodiments, in operation 503, the electronic device (e.g., the processor 120 or 201) may identify whether the channel state of the external device 210 satisfies a specified first condition. According to an embodiment, if the channel state (e.g., an MCS level) of the external device 210 is continuously lower than a reference state for a designated first time period, the processor 201 may determine that the designated first condition is satisfied. According to an embodiment, if the channel state (e.g., an MCS level) of the external device 210 is continuously exceeds the reference state, the processor 201 may determine that the designated first condition is not satisfied.

According to various embodiments, if the electronic device (e.g., the processor 120 or 201) determines that the channel state of the external device 210 does not satisfy the designated first condition (e.g., "No" in operation 503), the electronic device may determine that the external device 210 is not located in a cell edge region. Based on determination that the external device 210 is not located in the cell edge region, the electronic device (e.g., the processor 120 or 201) may terminate an embodiment for identifying the channel variation of the external device 210 located in the cell edge region.

According to various embodiments, if the electronic device (e.g., the processor 120 or 201) determines that the channel state of the external device 210 satisfies the designated first condition (e.g., "Yes" in operation 503), the electronic device may identify the channel variation of the external device 210, in operation 505. For example, if it is determined that the channel state of the external device 210 satisfies the designated first condition, the processor 201 may determine that the external device 210 is located in the cell edge region. The processor 201 may identify the channel variation of the external device 210 in order to configure a channel estimation scheme of the external device 210 located in a cell edge region. For example, when the processor 201 determines that the external device 210 is located in the cell edge region, the processor 201 may control the communication circuit 203 to transmit a request signal related to the channel variation to the external device 210. For example, configuration of the channel estimation scheme of the external device 210 may include a series of operations of configuring a frequency hopping interval and/ or an assignment ratio of a reference signal which are associated with assignment of at least one reference signal used for channel estimation of the external device 210. For example, the frequency hopping interval may include the number of slots consecutively assigned to the external device 210 in the same frequency band. For example, the assignment ratio of the reference signal may include the number of reference signals assigned in a time resource block (e.g., a slot).

FIG. 6 is a flowchart for configuring an assignment ratio of a reference signal by an electronic device according to an embodiment of the disclosure.

According to an embodiment, operations of flowchart 600 of FIG. 6 may be detailed operations of operation 305 of FIG. 3. In the following embodiments, each of operations may be sequentially performed, but is not necessarily performed sequentially. For example, the order of each operation may be changed, and at least two operations may be performed in parallel. As an example, an electronic device of FIG. 6 may be the electronic device 101 of FIG. 1 or the electronic device 200 of FIG. 2. As an example, at least a part of FIG. 6 may be described with reference to FIGS. 7A and 7B.

Figure 7B:
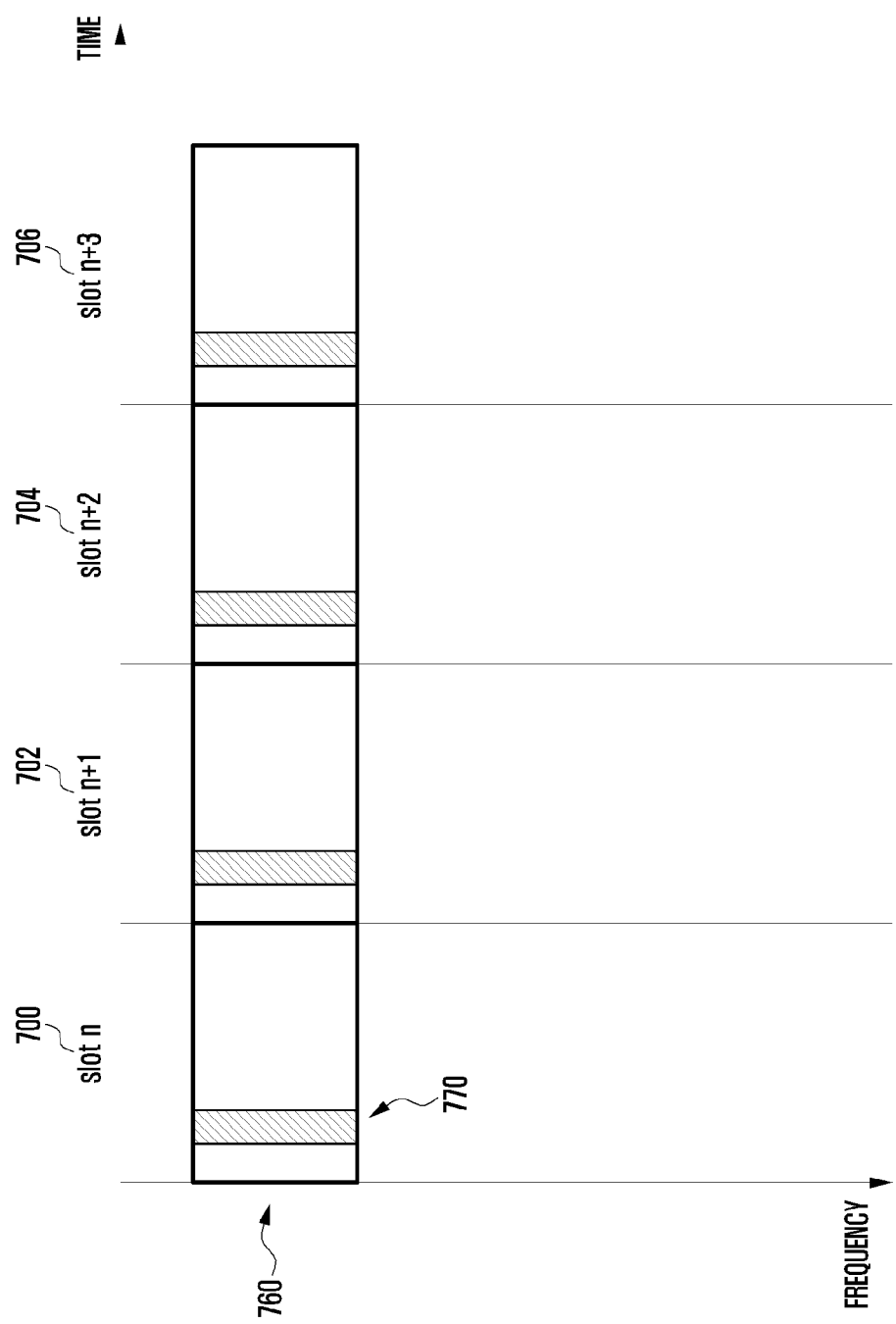
FIG. 7B is an example of assigning a reference signal at a second ratio by an electronic device according to an embodiment of the disclosure.

FIG. 7A is an example of assigning a reference signal at a first ratio by an electronic device according to an embodiment of the disclosure. FIG. 7B is an example of assigning a reference signal at a second ratio by the electronic device according to an embodiment of the disclosure.

Referring to FIGS. 6, 7A, and 7B, when an electronic device (e.g., a processor 120 of FIG. 1 or a processor 201 of FIG. 2) configures the frequency hopping interval of the external device 210 (e.g., operation 303 of FIG. 3), the electronic device may identify, in operation 601, whether the frequency hopping interval of the external device 210 satisfies a designated second condition. According to an embodiment, if the frequency hopping interval of the external device 210 is the first interval (e.g., the maximum interval) or the fourth interval (e.g., the minimum interval), the processor 201 may determine that the designated second condition is satisfied. For example, if the channel variation of the external device 210 is relatively small or relatively large, the processor 201 may determine that the specified second condition is satisfied. According to an embodiment, if the frequency hopping interval of the external device 210 is the second interval (e.g., three slots) or the third interval (e.g., two slots), the processor 201 may determine that the designated second condition is not satisfied.

According to various embodiments, if the electronic device (e.g., the processor 120 or 201) determines that the frequency hopping interval of the external device 210 satisfies the designated second condition (e.g., "Yes" in operation 601), the electronic device may configure, in operation 603, an assignment ratio of a reference signal corresponding to the external device 210. According to an embodiment, the processor 201 may configure the assignment ratio of the reference signal to be assigned to the external device 210, based on a channel state (e.g., SNR) and the channel variation of the external device 210. For example, the assignment ratio of the reference signal may be configured to be proportional to the channel variation of the external device 210, and to be inversely proportional to the channel state (e.g., SNR).

According to an embodiment, if the channel variation of the external device 210 is greater than the third reference variation (e.g., the fourth interval), and the channel state (e.g., SNR) with respect to the external device 210 is lower than a reference state (e.g., a weak electric field), the processor 201 may assign a second number (e.g., four) of reference signals 750 per slot, as shown in FIG. 7A. For example, when the frequency hopping interval is configured to the fourth interval (e.g., 1 slot), based on the channel variation of the external device 210, the processor 201 may control the communication circuit 203 to transmit the second number of reference signals 750 via a first frequency band 710 in an nth slot 700, as shown in FIG. 7A. The processor 201 may control the communication circuit 203 to transmit the second number of reference signals 750 via a second frequency band 720 in an (n+1)th slot 702. The processor 201 may control the communication circuit 203 to transmit the second number of reference signals 750 via a third frequency band 730 in an (n+2)th slot 704. The processor 201 may control the communication circuit 203 to transmit the second number of reference signals 750 via a fourth frequency band 740 in an (n+3)th slot 706. For example, the first frequency band 710, the second frequency band 720, the third frequency band 730, and the fourth frequency band 740 may be selected based on a predefined frequency hopping pattern.

According to an embodiment, if the channel variation of the external device 210 is less than the first reference variation (e.g., the first interval), and the channel state (e.g., SNR) with respect to the external device 210 is greater than the reference state (e.g., a strong electric field), the processor 201 may assign the first number (e.g., one) of reference signals 770 per slot, as shown in FIG. 7B. For example, when the frequency hopping interval is configured to the first interval (e.g., four slots), based on the channel variation of the external device 210, the processor 201 may control the communication circuit 203 to transmit the first number of reference signals 770 via each of the nth slot 700, the (n+1)th slot 702, the (n+2)th slot 704, and the (n+3)th slot 706 assigned to a fifth frequency band 760, as shown in FIG. 7B.

According to various embodiments, in operation 605, the electronic device (e.g., the processor 120 or 201) may transmit, to the external device 210, information related to reference signal assignment information and the frequency hopping interval of the external device 210.

According to various embodiments, if the frequency hopping interval of the external device 210 does not satisfy the designated second condition (e.g., "No" in operation 601), the electronic device (e.g., the processor 120 or 201) may transmit, to the external device 210, information related to the frequency hopping interval of the external device 210, in operation 607.

According to an embodiment, the processor 201 may configure the assignment ratio of the reference signal to be assigned to the external device 210, based on the channel state (e.g., SNR) and the channel variation of the external device 210 irrespective of the frequency hopping interval of the external device 210. In an embodiment, operations 601 and 607 of FIG. 6 may be omitted.

Figure 8:
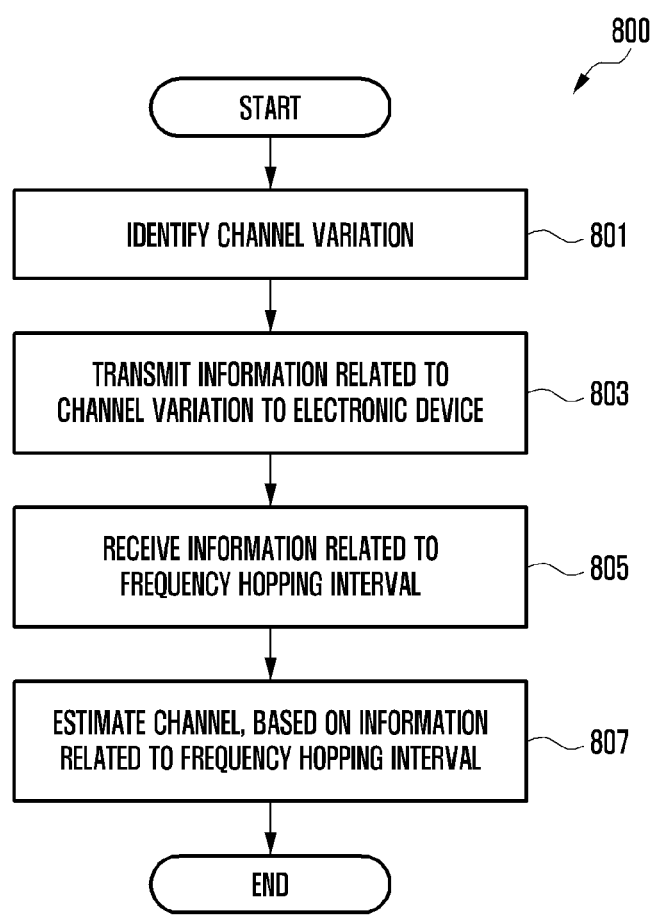
FIG. 8 is a flowchart for channel estimation by an external device according to an embodiment of the disclosure.

FIG. 8 is a flowchart for estimating a channel by an external device according to an embodiment of the disclosure.

In the following embodiments, each of operations may be sequentially performed, but is not necessarily performed sequentially. For example, the order of each operation may be changed, and at least two operations may be performed in parallel. As an example, an external device of FIG. 8 may be the electronic device 101 of FIG. 1 or the external device 210 of FIG. 2.

Referring to FIG. 8, in flowchart 800 an external device (e.g., a processor 120 of FIG. 1 or a processor 211 of FIG. 2) may identify a channel variation of an external device 210, in operation 801. According to an embodiment, when a request signal related to the channel variation is received from the electronic device 200 via the communication circuit 213, the processor 211 may identify information related to the channel variation of the external device 210. According to an embodiment, a communication link is established with the electronic device 200 via the communication circuit 213, the processor 211 may periodically identify information related to the channel variation of the external device 210. For example, information related to the channel variation of the external device 210 may include a position change (e.g., a moving distance) of the external device 210, a change in a start position of a frame (or a start position of a symbol), which is measured by the external device 210, and/or information related to Doppler spread. For example, a position change (e.g., a moving distance) of the external device 210 may be detected based on a positioning system (GNSS). For example, a change in a start position of a frame (or a start position of a symbol), which is measured by the external device 210, may be detected based on a synchronization signal and/or a reference signal received from the electronic device 200. For example, the Doppler spread of the external device 210 may be detected based on the reference signal received from the electronic device 200.

According to various embodiments, in operation 803, the external device (e.g., the processor 120 or 211) may transmit information related to the channel variation of the external device 210 to the electronic device 200. For example, information related to the channel variation of the external device 210 may be transmitted to the electronic device 200 via a PUCCH and/or UCI.

According to various embodiments, in operation 805, the external device (e.g., the processor 120 or 211) may receive information related to the frequency hopping interval and/or an assignment ratio of a reference signal from the electronic device 200.

According to various embodiments, in operation 807, the external device (e.g., the processor 120 or 211) may estimate a channel with respect to the electronic device 200, based on information related to the assignment ratio of the reference signal and/or the frequency hopping interval received from the electronic device 200. According to an embodiment, as shown in FIG. 4A, if the frequency hopping interval is configured to the third interval (e.g., two slots), the processor 211 may estimate a channel corresponding to the first frequency band 410 by using the reference signal 430 assigned to the nth slot 400 and (n+1)th slot 402 received via the first frequency band 410. The processor 211 may estimate a channel corresponding to the second frequency band 420 by using the reference signal 430 assigned to the (n+2)th slot 404 and the (n+3)th slot 406 received via the second frequency band 420. For example, the processor 211 may estimate a downlink channel with respect to the electronic device 200, based on an inter-slot channel estimation scheme within the nth slot 400 and the (n+1)th slot 402, or the (n+2)th slot 404 and the (n+3)th slot 406.

According to an embodiment, as shown in FIG. 4B, if the frequency hopping interval is configured to the first interval (e.g., four slots), the processor 211 may estimate the downlink channel with respect to the electronic device 200 by using the reference signal 430 assigned to the nth slot 400, the (n+1)th slot 402, the (n+2)th slot 404, and the (n+3)th slot 406 received via the third frequency band 450.

According to various embodiments, the external device 210 may transmit a channel change level corresponding to the channel variation of the external device 210 to the electronic device 200. According to an embodiment, the processor 211 may obtain information related to at least one reference variation related to the configuration of the channel change level from the electronic device 200 via the communication circuit 213. For example, the information related to at least one reference variation related to the configuration of the channel change level may be obtained via an RRC message, a system information block (SIB), DCI, and/or an MAC CE.

According to one embodiment, if the channel variation of the external device 210 is less than the first reference variation (e.g., about 25 Hz), the processor 211 may control the communication circuit 213 to transmit information related to the first channel change level to the electronic device 200. For example, the first channel change level may include a state in which the channel change of the external device 210 is relatively small.

According to an embodiment, if the channel variation of the external device 210 is equal to or greater than the first reference variation (e.g., about 25 Hz) and is less than the second reference variation (e.g., about 50 Hz), the processor 211 may control the communication circuit 213 to transmit information related to the second channel change level to the electronic device 200. For example, the second channel change level may include a state in which the channel change of the external device 210 is greater than the first channel change level and is smaller than the third channel change level.

According to an embodiment, if the channel variation of the external device 210 is greater than or equal to the second reference variation (e.g., about 50 Hz) and is less than the third reference variation (e.g., about 100 Hz), the processor 211 may control the communication circuit 213 to transmit information related to the third channel change level to the electronic device 200. For example, the third channel change level may include a state in which the channel change of the external device 210 is greater than the second channel change level and is smaller than the fourth channel change level.

According to an embodiment, if the channel variation of the external device 210 is greater than or equal to the third reference variation (e.g., about 100 Hz), the processor 201 may control the communication circuit 213 to transmit information related to the fourth channel change level to the electronic device 200. For example, the fourth channel change level may include a state in which the channel change of the external device 210 is relatively large.

According to various embodiments, an operation method of an electronic device (e.g., the electronic device 101 of FIG. 1 or the electronic device 200 of FIG. 2) may include identifying a channel variation of an external device connected to the electronic device for communication, configuring a frequency hopping interval corresponding to the external device, based on the channel variation of the external device, transmitting information related to the frequency hopping interval to the external device, and transmitting, based on the frequency hopping interval, at least one reference signal assigned to at least one slot corresponding to at least one frequency band to the external device.

According to various embodiments, the identifying of the channel variation may include estimating the channel variation of the external device, based on information related to a position change of the external device, which is received from the external device.

According to various embodiments, the identifying of the channel variation may include estimating the channel variation of the external device, based on information related to a start position change of a frame, which is received from the external device.

According to various embodiments, the identifying of the channel variation may include estimating the channel variation of the external device, based on a Doppler spread value of the external device, which is received from the external device.

According to various embodiments, the identifying of the channel variation may include estimating the channel variation of the external device, based on a timing advance (TA) value of the external device, which is collected for a designated time period.

According to various embodiments, the identifying of the channel variation may include identifying a Doppler spread value, based on an uplink reference signal received from the external device, and estimating the channel variation of the external device, based on the Doppler spread value.

According to various embodiments, the operation method may further include configuring an assignment ratio of a reference signal corresponding to the external device, based on the channel variation of the external device and/or a channel state of the external device, and assigning at least one reference signal to each of the at least one slot, based on the assignment ratio of the reference signal.

According to various embodiments, the transmitting of the information related to the frequency hopping interval to the external device may include transmitting information related to the frequency hopping interval and the assignment ratio of the reference signal to the external device.

According to various embodiments, the configuring of the assignment ratio of the reference signal may include configuring, when the frequency hopping interval corresponding to the external device satisfies a designated condition, the assignment ratio of the reference signal corresponding to the external device, based on the channel variation of the external device and/or the channel state of the external device.

According to various embodiments, the operation method may further include determining that the designated condition is satisfied when the frequency hopping interval corresponding to the external device is configured to a maximum interval and/or a minimum interval.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A base station comprising:
communication circuitry;
a processor operatively connected to the communication circuitry; and
memory storing instructions which, when executed by the processor, cause the base station to:
identify a difference value of channels during a designated time period on a user equipment performing communication with the base station via the communication circuitry,
based on the difference value of channels on the user equipment, configure a frequency hopping interval corresponding to the user equipment,
transmit, to the user equipment via the communication circuitry, information related to the frequency hopping interval, and
based on the frequency hopping interval, transmit, to the user equipment via the communication circuitry, at least one reference signal assigned to at least one slot corresponding to at least one frequency band.

2. The base station of claim 1, wherein the memory storing instructions which, when executed by the processor, cause the base station to:
estimate the difference value of channels on the user equipment based on at least one of position information related to a position change of the user equipment, start information related to a start position change of a frame, or a Doppler spread value of the user equipment as identified by the base station, the at least one of position information, start information, or the Doppler spread value being received from the user equipment via the communication circuitry.

3. The base station of claim 1, wherein the memory storing instructions which, when executed by the processor, cause the base station to:
estimate the difference value of channels on the user equipment based on a timing advance (TA) value of the user equipment, the TA value being collected for the designated time period.

4. The base station of claim 1, wherein the memory storing instructions which, when executed by the processor, cause the base station to:
identify a Doppler spread value based on an uplink reference signal received from the user equipment via the communication circuitry, and
based on the Doppler spread value, estimate the difference value of channels on the user equipment.

5. The base station of claim 1, wherein the memory storing instructions which, when executed by the processor, cause the base station to:
configure an assignment ratio of a reference signal corresponding to the user equipment based on at least one of the difference value of channels on the user equipment or a channel state of the user equipment, and
based on the assignment ratio of the reference signal, assign at least one reference signal to each of the at least one slot.

6. The base station of claim 5, wherein the memory storing instructions which, when executed by the processor, cause the base station to:
transmit, to the user equipment via the communication circuitry, the information related to the frequency hopping interval and the assignment ratio of the reference signal.

7. The base station of claim 5, wherein the memory storing instructions which, when executed by the processor, cause the base station to:
in response to the frequency hopping interval corresponding to the user equipment satisfying a designated condition, configure the assignment ratio of the reference signal corresponding to the user equipment based on the at least one of the difference value of channels on the user equipment or the channel state of the user equipment.

8. The base station of claim 7, wherein the memory storing instructions which, when executed by the processor, cause the base station to:
based on the frequency hopping interval corresponding to the user equipment being at least one of a maximum interval or a minimum interval, determine that the designated condition is satisfied.

9. An operation method of a base station, the operation method comprising:
identifying, by the base station, a difference value of channels during a designated time period on a user equipment connected to the base station for communication;
based on the difference value of channels on the user equipment, configuring, by the base station, a frequency hopping interval corresponding to the user equipment;
transmitting, by the base station to the user equipment, information related to the frequency hopping interval; and
based on the frequency hopping interval, transmitting, by the base station to the user equipment, at least one reference signal assigned to at least one slot corresponding to at least one frequency band.

10. The operation method of claim 9, wherein the identifying of the difference value of channels comprises estimating the difference value of channels on the user equipment based on at least one of position information related to a position change of the user equipment, start information related to a start position change of a frame, or a Doppler spread value of the user equipment as identified by the base station, the at least one of the position information, the start information, or the Doppler spread value being received from the user equipment.

11. The operation method of claim 9, wherein the identifying of the difference value of channels comprises estimating the difference value of channels on the user equipment based on a timing advance (TA) value of the user equipment, the TA value being collected for the designated time period.

12. The operation method of claim 9, wherein the identifying of the difference value of channels comprises:
identifying, by the base station, a Doppler spread value based on an uplink reference signal received from the user equipment; and
based on the Doppler spread value, estimating, by the base station, the difference value of channels on the user equipment.

13. The operation method of claim 9, further comprising:
configuring, by the base station, an assignment ratio of a reference signal corresponding to the user equipment based on at least one of the difference value of channels on the user equipment or a channel state of the user equipment; and
based on the assignment ratio of the reference signal, assigning, by the base station, at least one reference signal to each of the at least one slot.

14. The operation method of claim 13, wherein the transmitting of the information related to the frequency hopping interval comprises transmitting, by the base station to the user equipment, information related to the frequency hopping interval and the assignment ratio of the reference signal.

15. The operation method of claim 13, wherein the configuring of the assignment ratio of the reference signal comprises, in response to the frequency hopping interval corresponding to the user equipment satisfying a designated condition, configuring, by the base station, the assignment ratio of the reference signal corresponding to the user equipment based on the at least one of the difference value of channels on the user equipment or the channel state of the user equipment.

16. The operation method of claim 15, further comprising:
based on the frequency hopping interval corresponding to the user equipment being at least one of a maximum interval or a minimum interval, determining, by the base station, that the designated condition is satisfied.

17. The operation method of claim 10, wherein the position change of the user equipment is measured based on a positioning system of the user equipment during a set time period.

18. The operation method of claim 9, further comprising:
configuring, by the base station, as the frequency hopping interval, a specific frequency hopping interval corresponding to the difference value of channels on the user equipment,
wherein the specific frequency hopping interval is detected in a predefined frequency hopping interval table, and
wherein the specific frequency hopping interval includes a number of slots consecutively assigned to the user equipment in a same frequency band.

19. The operation method of claim 13, further comprising:
configuring, by the base station, the assignment ratio of the reference signal to be proportional to the difference value of channels on the user equipment and inversely proportional to the channel state of the user equipment.

20. The operation method of claim 13, wherein the assignment ratio of the reference signal includes a number of reference signals assigned in a slot.

* * * * *